United States Patent [19]

Sebalos et al.

[11] Patent Number: 4,583,071
[45] Date of Patent: Apr. 15, 1986

[54] BRAKE ADJUSTMENT MONITORING DEVICE FOR AUTOMOTIVE VEHICLES

[76] Inventors: Adam Sebalos, 140 Charles St., Jersey City, N.J. 07307; Jesse L. Colodner, 322 Orangeburg Rd., Pearl River, N.Y. 10965

[21] Appl. No.: 443,241

[22] Filed: May 2, 1984

[51] Int. Cl.⁴ .............................................. B60Q 1/00
[52] U.S. Cl. .............................. 340/52 B; 340/52 R; 188/1.11
[58] Field of Search ................ 340/52 B, 52 A, 52 R, 340/69; 200/83 L, 82 E, 81.9 M; 188/1.11

[56] References Cited

U.S. PATENT DOCUMENTS 3,691,522  9/1972  Hocking et al. .................. 340/52 C
3,697,942 10/1972  Hocking et al. .................. 340/52 C
4,020,454  4/1977  Malonee .......................... 340/52 B
4,122,434 10/1978  Jensen ............................ 340/52 B
4,188,613  2/1980  Yang et al. ...................... 340/52 B
4,362,053 12/1982  Barrett ........................... 340/52 B

FOREIGN PATENT DOCUMENTS 1512003  5/1978  United Kingdom ............... 188/1.11

Primary Examiner—John W. Caldwell, Sr.
Assistant Examiner—Tyrone Queen

[57] ABSTRACT

This brake adjustment monitoring device, serves to warn the operators of trucks, buses and other vehicles, when their brakes are in need of adjustment or repair, which will effectively cut down the number of accidents caused by brakes being out of adjustment. Primarily, the device consists of a magnet adjustably secured to the shaft of the diaphragm within each air chamber. It also includes a block with a reed switch in it that is in cooperation with the magnet, so as to close the switch by magnetic force when the shaft of the air chamber moved outward too far, when the operator touches the brake pedal of the vehicle. It further includes a cab mounted indicator unit, having a buzzer and a bulb for alerting the operator when the brakes are in need of adjustment.

4 Claims, 10 Drawing Figures

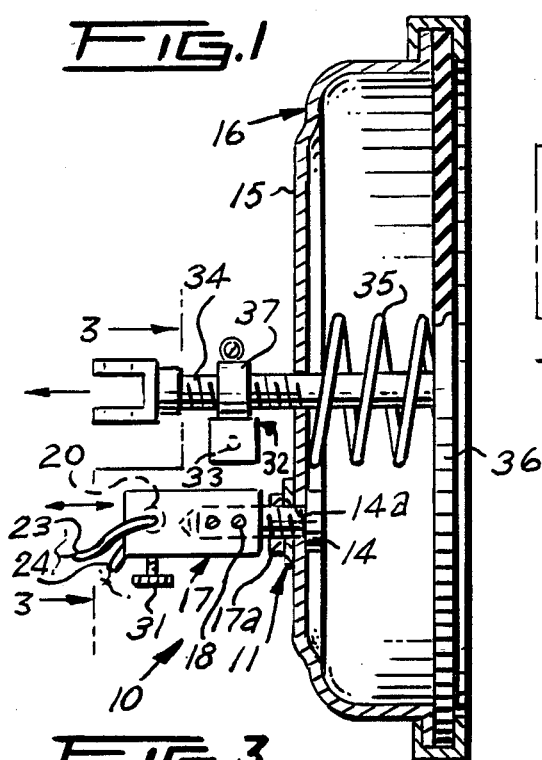
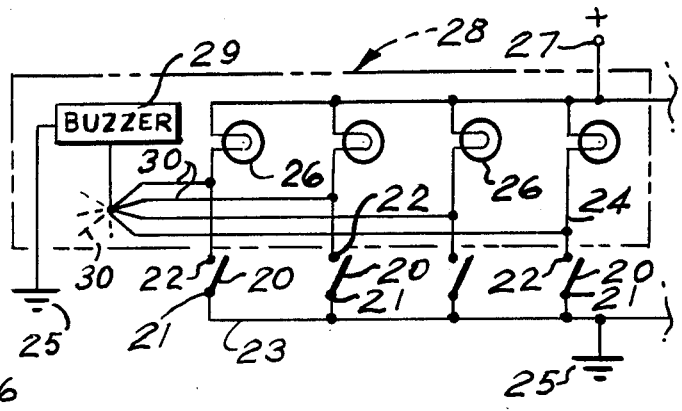
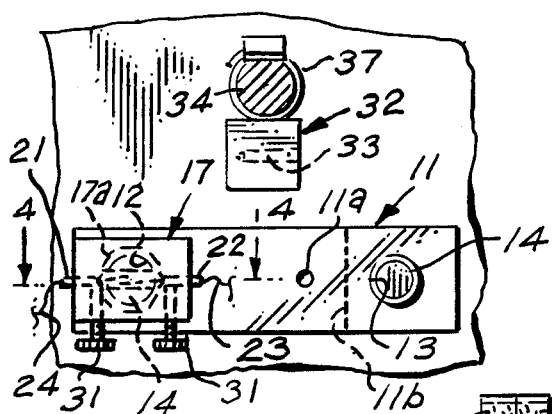
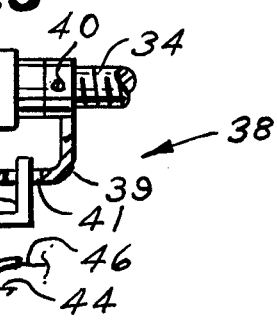
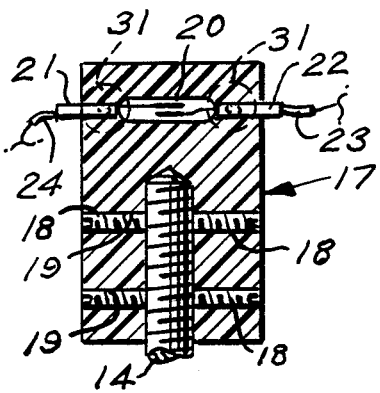
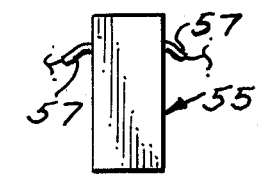
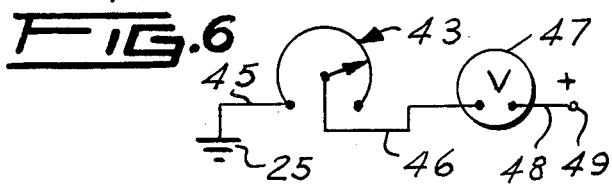
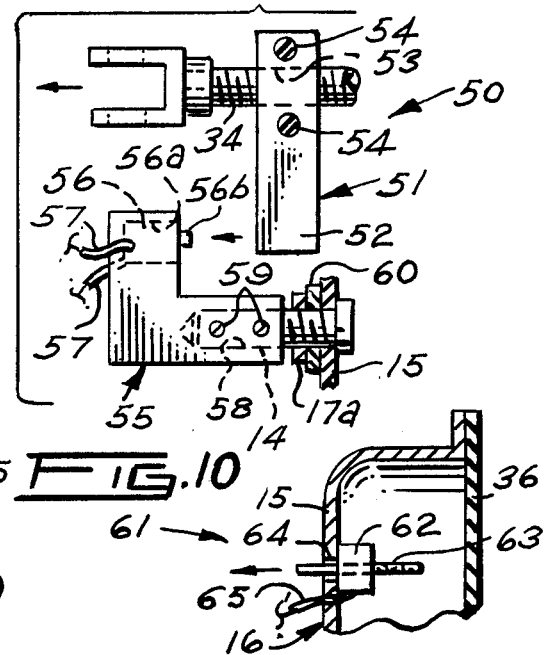

BRAKE ADJUSTMENT MONITORING DEVICE FOR AUTOMOTIVE VEHICLES

This invention relates to safety devices, and more particularly, to a brake adjustment monitoring device for automotive vehicles.

The principal object of this invention is to provide a brake adjustment monitoring device for automotive vehicles, which will be employed on trucks, buses, and the like, so as to prevent unnecessary accidents, which occur daily, because mechanics did not, or could not examine the brakes of the vehicles to see if they required adjustments.

It is well known in the art, that a driver may test the brakes of his vehicle prior to going on the road, but if the brakes of the vehicle are almost out of adjustment, he will not find out until he urges down against the brake pedal and finds they the brakes do not work. Break failure in most cases, is simply brake wear to the point, where the brake shoes fail to press against the drum, due to the maximum length the air brake shaft can travel.

Another object of this invention is to provide a brake adjustment monitoring device for automotive vehicles, which will enable the driver to have continuous monitoring of his vehicle's brakes, and if the adjustment shaft is reaching the point where the brakes should be adjusted, an indicator mounted on the dashboard in the cab, will flash a light.

Another object of this invention is to provide a brake adjustment monitoring device for automotive vehicles, which will also include a sound emitting device, which will be activated simultaneously, as the indicator warning light.

A further object of this invention is to provide a brake adjustment monitoring device for automotive vehicles, which will employ switch and circuit means, that will not be adversely effected by weather conditions, and the device alerts the driver, before the brakes are inoperable, thus enabling the driver to cautiously continue his route and have the brakes adjusted and tested at the end of his run.

A still further object of this invention is to provide a brake adjustment monitoring device for automotive vehicles, which will be so designed, that it will be adaptable for use with various types of switch means.

An even further object of this invention is to provide a brake adjustment monitoring device for automotive vehicles. which will also function when applying the parking brakes, without any modification of the existing brake system, and the device may be so designed, so as to be installed on the interior of the air chambers of the vehicle brake system when the vehicle is manufactured.

Other objects of the invention are to provide a brake adjustment monitoring device for automotive vehicles, which will be simple in design, inexpensive to manufacture, rugged in construction, and easy to install.

These and other objects will become readily understood, upon a study of the specification and the accompanying drawing in which:

FIG. 1 is a vertical cross-sectional view of a typical brake air chamber showing the present invention installed thereon, and illustrating the mounting plate of the sensor in section and the diaphram of the chamber is shown partly broken away;

FIG. 2 is a fragmentary wiring diagram of the circuit of the invention, which illustrates the dashboard or otherwise located indication display;

FIG. 3 is an enlarged cross-sectional view, taken along the line 3—3 of FIG. 1;

FIG. 4 is an enlarged cross-sectional view, taken along the line 4—4 of FIG. 3;

FIG. 5 is a side view of a modified form of the invention, shown in elevation;

FIG. 6 is a schematic wiring diagram of FIG. 5;

FIG. 7 is a side view of another modified form of switch, shown in elevation;

FIG. 8 is a side view of the contact arm, shown in elevation and removed from FIG. 7;

FIG. 9 is a left end view of the micro-switch arm, shown in elevation and removed from FIG. 7, and FIG. 10 is fragmentary view of FIG. 1, shown in elevation, and illustrating still another modified form of the invention.

Accordingly, a device 10 is shown to include a mounting plate 11 which is provided with a pair of spaced-apart openings 12 and 13, for receiving threaded bolts 14 that extend from openings 14a through the end wall 15 of air chamber 16. Plate 11 is also provided with a smaller diameter opening 11a, which is spaced between openings 12 and 13, and is adjacent to a scored line 11b. The scored line 11b enables plate 11 to be easily broken off at one end, to adapt it to a differently designed air chamber, which will have a second bolt 14 of a smaller diameter. A block 17 made of a suitable plastic material, includes a pair of set screws 18 on each side, which are threaded into openings 19, and the screws 18 serve to render block 17 secure to one of the bolts 14 at any angle and distance from end wall 15 of air chamber 16, and a nut fastener 17a is received on the bolt 14 receiving block 17, so as to hold plate 11 down against end wall 15. A reed switch 20 is encapsulated within block 17, and its contacts 21 and 22 extend from the sides of block 17. Wire 23 of switch 20 connects with the ground 25 of the vehicle's circuit, and wire 24 connects with one side of a bulb 26. The opposite side of bulb 26 connects to the positive terminal 27 of the vehicle's circuit, and the indicator unit 28, which includes a switch 20 and a bulb 26 for each of the vehicle's air chambers 16, is dashboard or otherwise mounted in the cab of the vehicle. A buzzer 29 is also included in the indicator unit 28, so as to give an audible indication to the operator, simultaneously, as a bulb 26 flashes when either of the switches 20 closes, and one side of the buzzer 29 connects to the vehicle's ground 25, and its opposite side connects by wires 30, to each of the wires 24 of bulbs 26.

A pair of set screws 31, are also received in block 17, so as to render the contacts 21 and 22 of switch 20 secure, and a second block 32 of suitable plastic material, encapsulates a permanent magnet 33. which cooperates with reed switch 20 through magnetic flux to close switch 20 when shaft 34, having spring 35 and the attached diaphragm 36, moves outwards a distance of approximately two and a quarter inches, which is the point where the brake needs adjustment or repair. An adjustable clamp 37 is fixedly secured to one side of second block 32 in a suitable manner, not shown, and is received on shaft 34, so as to render block 34 secure thereto, and clamp 37 enables the magnet 33 and its block 32 to be properly positioned on shaft 34 for the effective operation of switch 20.

In operation. when the operator of the vehicle touches the brake pedal with his foot, the diaphragm 36 urges its attached shaft 34 outwards, and if its travel is approximately two and a quarter inches the magnet 33, being moved to close proximity with switch 20, will cause switch 20 to close, and the bulb 26 secured in that particular circuit of switch 20, will light to give the operator indication. When the abovementioned occurs, the buzzer 29 will also be activated.

It shall also be recognized, that device 10 is further unique, because when the operator or mechanic applies the parking brakes, the device 10 will also give him indication at the unit 28, without any modification to the vehicle's existing brake system.

Referring now to FIGS. 5 and 6 of the drawing, a modified device 38 is shown to include an arm 39, which is secured to shaft 34 of chamber 16, by a set screw 40. An elongated opening 41 through the extending end of arm 39, freely receives the extending end of lever shaft 42 of a reostat 43, which is suitably secured to a mounting plate 44 that is mounted to a bolt 14 of air chamber 16 in a manner, similar to that heretofore described of plate 11 of device 10. One of the wires is secured to the vehicle's ground 25. and the other wire 46 is secured to one side of a voltmeter 47. The opposite side of voltmeter 47 is secured by wire 48 to a positive terminal 49 of the vehicle's circuit.

In operation when the operator of the vehicle touches the brake pedal with his foot, the shaft 34 moves outward by its attached diaphragm 36, and the arm 39 rotates lever shaft 42 of reostat 43, which will cause meter 47 to indicate, by increased voltage means.

Referring now to FIGS. 7,8, and 9, another modified device 50 is shown to include a contact arm 51, which is composed of a pair of plates 52. A semi-circular opening 53 in one face of each plate 52, aligns with each other to be received on the shaft 34 of air chamber 16, and a pair of screw fasteners 54 are threadingly received in plates 52, so as to adjustably render contact arm 51 secure to shaft 34, for cooperation with block 55, containing a micro switch 56. Block 55 is fabricated of a suitable plastic material, and micro-switch 56 is fixedly secured in opening 56a in a suitable manner, and its button 56b extends therefrom, for engagement with contact arm 51, when the brake associated therewith, needs adjustment. The extending wires 57 of switch 56, are wired into indicator unit 28 in place of one of the heretofore described switches 20 of device 10. The opposite end of block 55 receives one of the bolts 14 of air chamber 16, in its opening 58, and block 55 is adjustably fastened to bolt 14, by means of a pair of set screws 59. A mounting plate 60 is received on bolts 14 of end wall 15 of air chamber 16, in the same manner, as was heretofore described of block 17 of device 10.

In use, modified device 50 functions in the same manner, as was described of device 10, with the exception, that a contact arm 51 serves to directly strike the button 56b of micro-switch 56, to provide indication through the cab mounted indicator unit 28.

Looking now at FIG. 10, a further modified device 61, is shown to include a micro-switch 62, which is fixedly secured to the inside face of end wall 15 of chamber 16 in a suitable manner not shown. The button shaft 63 of switch 62 is threaded, so as to be adjustable, and is freely received in opening 64 of end wall 15, and is activated by contact with diaphragm 36. The wires 65 of micro-switch 62, extend from a second opening through end wall 15, and are wired into the indicator unit 28, in place of a switch 20.

In use, the function of device 61 is similar to the heretofore described switches 20, and 50, with the exception. that micro-switch 62 is internally mounted within air chamber 16, and is closed by contact of the button shaft 63 with the diaphram 36, when it travels to far inward.

While various changes may be made in the detail construction, such changes will be within the spirit and scope of the present invention, as defined by the appended claims.

We claim:

1. A brake adjustment monitoring device for vehicles, comprising, a mounting plate received on an existing air chamber included on a vehicle's brake, a combination magnetically sensitive switch and block secured to said mounting plate, for closing a circut of an indication unit when said brake is in need of adjustment, and a permanent magnet and block combination secured to an existing shaft of an existing diaphragm in said chamber, for cooperation with said combination magnetically sensitive switch and block wherein said mounting plate includes a pair of spaced openings receiving a pair of existing bolt fasteners of an end wall provided on said air chamber, and a nut fastener is received on one of said pair of existing bolt fasteners and renders said mounting plate secure to said air chamber, and said one of said pair of existing bolt fasteners is received in an opening provided in one end of said combination magnetically sensitive switch and block, and a plurality of set screws are provided and are threaded into openings provided in the block portion of said combination magnetically sensitive switch and block causing the switch portion of said combination magnetically sensitive switch and block to be adjustable in its spacing and angle with respect to said end wall of said air chamber.

2. The brake adjustment monitoring device according to claim 1, wherein said switch portion is encapsulated in said block portion that is fabricated of a suitable dielectric plastic, and a pair of wires extend from said switch portion and are wired in said circuit of an indication unit mounted in a vehicle.

3. The brake adjustment monitoring device according to claim 2, wherein said switch portion is spaced from said permanent magnet and block combination and said permanent magnet and block combination includes an adjustable clamp fixedly secured to oen side by a suitable adhesive, and said clamp is adjustably received and tightened on said shaft of said air chamber, and said shaft when urged outwards a pre-determined distance, urges said permanent magnet and block combination towards said switch portion, causing said circuit to close.

4. The brake adjustment monitoring device according to claim 3, wherein said pre-determined distance is the point where said diaphragm of said air chamber moves said shaft when brake adjustment is required, and a magnet is provided and encapsulated within said permanent magnet and block combination, and provides the magnetic flux that closes said switch portion that is sensitive to magnetic force.

* * * * *